United States Patent
Nishiyama

[11] Patent Number: 5,856,969
[45] Date of Patent: Jan. 5, 1999

[54] OPTICAL DISK WHICH REDUCES CROSS ERASURE OF DATA RECORDED ON LANDS AND GROOVES

[75] Inventor: Madoka Nishiyama, Yokohana, Japan

[73] Assignee: Nikon Corporation, Tokyo, Japan

[21] Appl. No.: 928,732

[22] Filed: Sep. 12, 1997

[30] Foreign Application Priority Data

Sep. 12, 1996 [JP] Japan .................................. 8-241550

[51] Int. Cl.$^6$ ....................................................... G11B 7/00
[52] U.S. Cl. .................... 369/275.4; 369/107; 369/275.1
[58] Field of Search ............................. 369/275.4, 275.1, 369/275.2, 107

[56] References Cited

U.S. PATENT DOCUMENTS

| | | | |
|---|---|---|---|
| 5,517,486 | 5/1996 | Haneda .................................. | 369/275.4 |
| 5,645,909 | 7/1997 | Kobayashi et al. ................... | 369/275.4 |
| 5,696,758 | 12/1997 | Yanagimachi et al. .............. | 369/275.4 |

FOREIGN PATENT DOCUMENTS 8-124311  5/1996  Japan .

*Primary Examiner*—Tod R. Swann
*Assistant Examiner*—Kim-Kwok Chu

[57] ABSTRACT

An optical disk is formed with grooves and lands for optically tracking an optical signal along a disk substrate. The lands and grooves are tracking guides on the surface of the disk substrate are coated with a recording film. The recording film varies in thickness over different portions of the tracking guides on the surface of the disk. A number of relationships and critical values may be determined by defining film thickness over the top of a land defined by (a), film thickness over a groove by (b), film thickness along a sidewall of a land by (c), groove depth from the top of a land to the bottom of a groove by (d1), and vertical film depth from the top of the film over a land to the top of the film over a groove by (d2). A difference in level (d2) of the recording film is preferably between 100–800 nm and a ratio (b/a) is preferably between 0.6–1.1. Also, a ratio (c/a) is preferably between 0–0.8. The relationships and critical values increase resistance to cross-erasure and allow track pitch to be decreased to enhance high density recording.

23 Claims, 3 Drawing Sheets

OPTICAL DISK WHICH REDUCES CROSS ERASURE OF DATA RECORDED ON LANDS AND GROOVES

CROSS-REFERENCE TO RELATED APPLICATIONS

This application is based upon and claims priority of Japanese Patent Application No. 08-241550 filed Sep. 12, 1996, the contents being incorporated herein by reference.

BACKGROUND OF THE INVENTION

The present invention relates to optical disks formed with grooves and lands for optically tracking an optical signal. More particularly, the present invention relates to optical disks having data which may be stored, played back, or erased from both lands and grooves.

Optical disks have a capacity for high density data storage and high speed data playback. In this regard, optical disks are particularly suited for consumer applications requiring the use of a computer. Conventional storage disks such as disks having a diameter of 5.25 inches or 3.5 inches, as well as magneto-optical disks or phase change disks capable of data re-writing, have been standardized by ISO standards.

A conventional magneto-optical disk, as illustrated in FIG. 6 (PRIOR ART), has a spiral formed from alternating concave and convex patterns extending outward from an inner circumference of the disk. The spiral is a guide for tracking data on a disk substrate 1. The data is tracked by a laser spot from a pickup 2 of a recording and playback device which follows the spiral.

The spiral is a tracking guide which has been defined in an ISO standard. In the ISO standard, concave portions 3 which are farthest away from pickup 2, i.e. remote portions, are called "lands." On the other hand, convex portions 4 which are closer to pickup 2 are called "grooves." The distance from the center of a land 3 to the center of an adjacent land 3 is called "track pitch," (P).

Generally, the depth (d3) of the grooves 4 is 50 nm, the width (W) is 0.4–0.6 $\mu$m, and the track pitch (P) is 1.4 $\mu$m. However, recent improvements in the art of optical disks have a narrowed track pitch with a track pitch (P) of 1.1 $\mu$m. This facilitates higher density data recording.

To enhance the recording density of such optical disks, the diameter of a beam spot which illuminates the surface of the optical disk may be made smaller. Methods to form a smaller beam spot having a reduced diameter include a method of shortening the wavelength of the light beam and a method of enlarging the numerical aperture (NA) of an objective lens.

However, the method of shortening the wavelength of the light beam is limited by the wavelengths of the semiconductor lasers used as a light source of the light beam. Moreover, the problem is that the form and power of short wavelength lasers are insufficient. On the other hand, the method of enlarging the numerical aperture (NA) of the objective lens of the recording and playback device is difficult because a high degree of technology is necessary to control aberration characteristics in the objective lens.

Consequently, there has recently been proposed a technique called "magnetically induced super resolution" ("MSR" hereinbelow), to increase apparent resolving power of a magneto-optical disk when playing back data which has been recorded at high density. The MSR technique increases apparent resolving power even when the wavelength of the light source and the size of the light spot used for playback are left unchanged from their conventional values.

The MSR method is a method of playing back recordings of data points which are smaller than the beam diameter. The MSR method reduces an effective playback aperture by magnetically forming an optical mask. The mask utilizes a rise in temperature distribution of an optical disk medium within the light spot due to the light itself and rotary motion of the optical disk medium. Thus, a portion of the signal which enters the light spot is masked from being detected as a playback signal.

In the MSR method, there is a Front Aperture Detection ("FAD") mode which masks a high temperature portion, a Rear Aperture Detection ("RAD") mode which masks a low temperature portion, and various other modes in which a magnet is necessary for operation. By way of the MSR method, playback resolving power is increased above the limitations of the optical system and recording density is increased in a linear density direction.

Recently, as another method of narrowing track pitch, techniques have been proposed for recording data on both lands and grooves (hereinbelow "land/groove recording methods"). The land/groove recording methods are in contrast to conventional recording methods which record data on either one of lands or grooves. The conventional recording methods utilize either a land or a groove as a guide between tracks. However, the land/groove recording methods virtually reduce the track pitch to half when compared with conventional recording methods. This effectively doubles the data storage capacity.

Nevertheless, in the land/groove recording methods, because track pitch (P) becomes half of the track pitch of the conventional storage medium, a number of problems develop. A significant problem is thermal crosstalk at the time of recording. Other problems include signal crosstalk between adjoining lands and grooves at the time of playback. A magneto-optical disk or a phase change disk is a thermal recording disk which requires a rise in temperature of the disk substrate due to interaction with the laser light. Thus, if the gap of adjacent tracks becomes small, thermal diffusion to the adjacent tracks becomes large. When first writing data to a track and then erasing data from the track, data written on adjacent tracks becomes erased. This is termed "thermal crosstalk" or "cross-erasure."

In a land/groove recording method, because both lands and grooves are used as recording tracks, both types of tracks are easily affected by cross-erasure. Moreover, during repeated recording, control of cross-erasure becomes increasingly important. For example, in conventional optical disks, the width of lands and grooves becomes limited to about 0.9 $\mu$m by problems of cross-erasure. Accordingly, track pitch can not be increasingly narrowed, which thereby becomes an obstacle to high density recording.

BRIEF SUMMARY OF THE INVENTION

It is therefore an object of the present invention to increase track density through a reduction in cross erasure in a magneto-optical or other like recording medium.

It is a further object of the present invention to provide a disk substrate with a non-uniform recording film thickness.

It is still a further object of the present invention to increase a transmission distance of heat from an illuminated light source in comparison with conventional optical disks.

Moreover, it is a further object of the present invention to screen off heat from a recording film while reducing cross erasure.

Objects of the invention are achieved by an optical disk, including a substrate formed with grooves and lands for tracking an optical signal and having a surface coated with a recording film, wherein the grooves have a width (Wg) and the lands have a width (Wl) each between 0.4 μm–1.0 μm, a difference between a top of the coated lands and a top of the coated grooves is between 50 nm–800 nm, and a ratio (b/a) of film thickness (b) on the top of the groove and film thickness (a) on the top of the land is between 0.6–1.1.

Further objects of the invention are achieved by an optical disk, including a land formed on a surface of the optical disk having a width (Wl) between 0.4 μm–1.0 μm; a groove formed on the surface of the optical disk having a width (Wg) between 0.4 μm–1.0 μm; a recording film coating the land and the groove, wherein a level (d2) from a top of the recording film on the land to a top of the recording film on the groove is between 100 nm–800 nm.

Moreover, objects of the invention are achieved by an optical disk, including a land formed on the surface of the optical disk having a width (Wl) between 0.4 μm–1.0 μm; a groove formed on the surface of the optical disk having a width (Wg) between 0.4 μm–1.0 μm; and a recording film coating the land and the groove, wherein a level (d2) from a top of the recording film on the land to a top of the recording film on the groove is between 100 nm–800 μm, recording film thickness coating the land is denoted by (a), recording film thickness coating the groove is denoted by (b), recording film thickness coating the sidewall surfaces of each land is denoted by (c), a ratio (b/a) is between 0.6–1.1, and a ratio (c/a) is between 0–0.8.

Preferably, the slope angle of the sidewall is greater than 60°. It is even more preferable for the slope angle of the sidewall to be greater than 70°.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
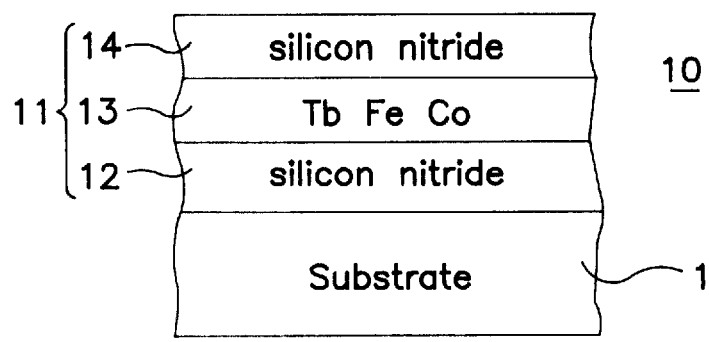
FIG. 1 is a cross sectional view of an optical disk according to a preferred embodiment of the present invention.

Reference will now be made in detail to the preferred embodiments of the present invention, examples of which are illustrated in the accompanying drawings, wherein like reference numerals refer to like elements throughout.

Figure 2:
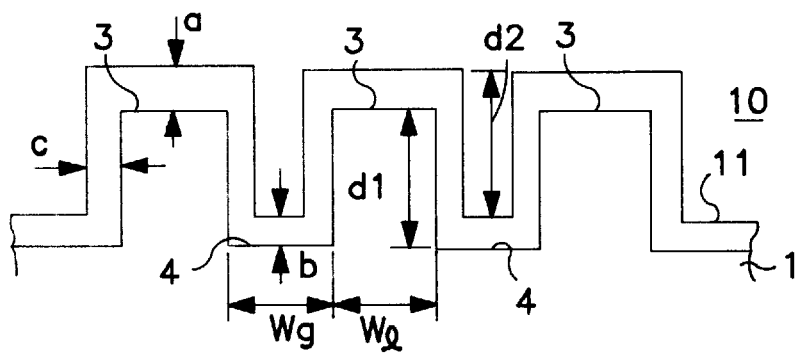
FIG. 2 is an enlarged cross sectional view of a portion of an optical disk according to a preferred embodiment of the present invention.
Figure 6:
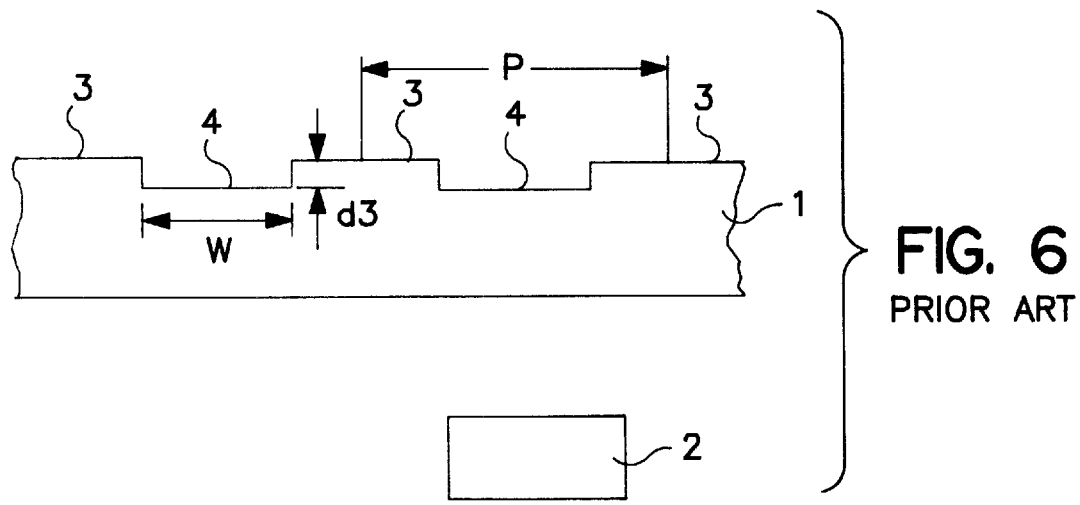
FIG. 6 (PRIOR ART) is a cross sectional view of a portion of a conventional optical disk.

FIG. 1 is a cross sectional view of an optical disk 10 according to a preferred embodiment of the present invention. FIG. 2 is an enlarged cross sectional view of a portion of optical disk 10. Optical disk 10 includes disk substrate 1 which is formed of transparent polycarbonate or the like. Disk substrate 1 has a circular disk shape and includes lands 3 and grooves 4 formed onto the surface. One surface of disk substrate 1 is coated with recording film 11. The distance of land width (Wl) and the distance of groove width (Wg) are both preferably equal to 0.4–1.0 μm. The depth (dl) of grooves 4 is formed deeper (100 nm or more) than the depth of conventional art grooves (which are about 50 nm).

Recording film 11 is formed by sputtering, vapor deposition and the like, and includes three layers, e.g. a lower layer which is a transparent dielectric layer of silicon nitride, a recording layer 13 of TbFeCo, and a protective layer 14 of silicon nitride. Conventional optical disks have a recording film which is formed with a uniform thickness. However, according to the preferred embodiments in the present invention, recording film 11 has a non-uniform thickness. The portion coating the upper surface of lands 3 has a film thickness (a), the portion coating the bottom surface of grooves 4 has a film thickness (b), and the portion coating sidewall portions of grooves 4 has a film thickness (c). The portions are controlled and formed such that (b/a) is between 0.6–1.1. Moreover, (c/a) is between 0–0.8. Such control of the coating thickness is possible by sputtering from an inclined direction during film formation. To provide uniform sputtering, gas pressure is adjusted to cause disk substrate 1 to rotate. The difference in level (d2) of recording film 11 due to the lands 3 and grooves 4 is between 100–800 nm.

Next, a method of manufacturing a magneto-optical disk according to a preferred embodiment of the present invention is described. First, a master disk, i.e. a stamper which has a pattern for lands and grooves, and a glass substrate are prepared. Then, an ultraviolet sensitive hardening resin is injected between the stamper and the glass substrate. The injected resin is then hardened by ultraviolet light. This forms a transparent, circular plate disk substrate 1 having a diameter of 86 mm, an internal diameter of 15 mm, a thickness of 1.2 mm. Land 3 and grooves 4 are manufactured on the glass substrate in this way. Another method to manufacture disk 1 is to injection mold resin with a stamper.

A transparent dielectric layer 12 of silicon nitride is formed onto disk substrate 1 by sputtering. The film thickness of the transparent dielectric layer 12 is 70 nm. Moreover, a 50 nm TbFeCo layer, i.e. recording layer, 13 is formed by sputtering onto transparent layer 12. The composition of the TbFeCo is Tb 21, (Fe 90 Co 10) 79. Furthermore, a 70 nm thick protective layer 14 of silicon nitride is formed onto recording layer 13, thereby completing the manufacture of magneto-optical disk 10. A phase change disk can also be used as an optical disk according to the preferred embodiments of the present invention.

Plural optical disks may be manufactured by the above manufacturing method while changing a difference in level (d2) and film thicknesses (a), (b) and (c) of recording film 11. By way of an example, the optical disks are then mounted in a recording and playback device and data is then recorded onto the lands or grooves of each disk. Cross-erasure is then measured for each disk. The measurement uses an optical pickup having a semiconductor laser of wavelength 680 nm and an objective lens of numerical aperture (NA) 0.55.

First, the direction of magnetization of recording layer 13 is aligned in a uniform erased state by applying a magnetic field to recording film 11. Next, at a linear velocity of 9m/sec, record pits of 0.64 μm in length are recorded at a single frequency on one land track. The optimum recording laser power at this time is (Pp). The two grooves adjacent to this land are then respectively illuminated ten times with an erasure laser. This erasure laser, at a fixed intensity, has a lower laser power than an optimum recording laser power (Pp).

After this, returning to the recorded land, measurements are performed of the carrier level and noise level from the playback signal. Here, erasure laser power (Pe) is found at which the carrier level begins to fall. Cross-erasure quantification is next performed by determining (Pe/Pp). This is a term of resistance to cross-erasure. Similarly, measurements are performed for the case of recording on one groove track and erasure of two lands adjacent to this groove.

Figure 3:
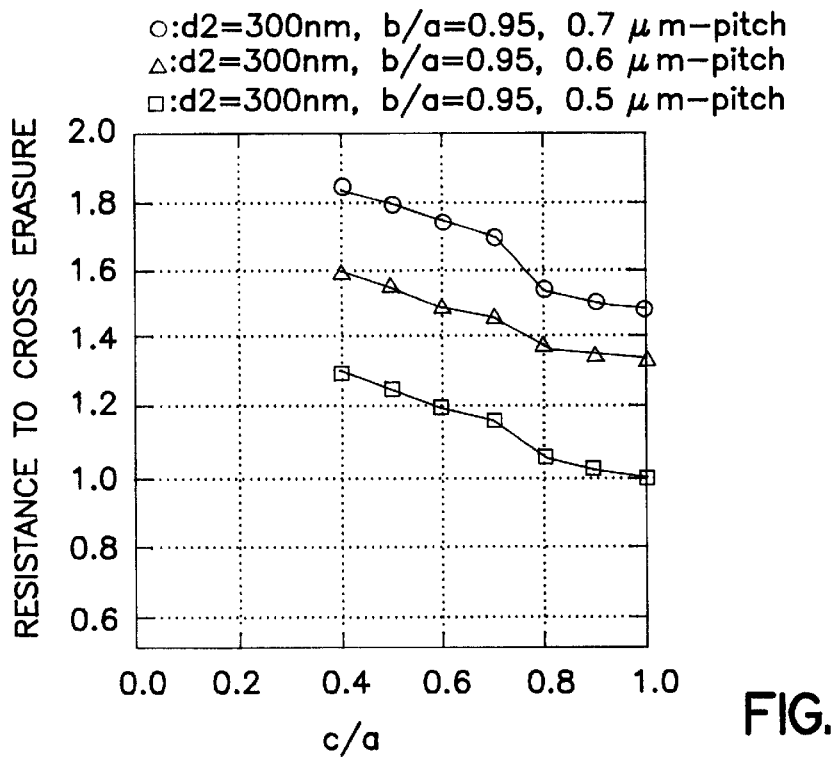
FIG. 3 is a graph of resistance to cross erasure and film thickness ratio (c/a) for an optical disk according to a preferred embodiment of the present invention.

In FIG. 3, resistance to cross-erasure (Pe/Pp) is plotted against a ratio (c/a) of film thickness (c) in groove sidewall portions of recording layer 11 and film thickness (a) in the land top surface. As illustrated in FIG. 3, when (d2) and (b/a) are respectively fixed in a respective track pitch, resistance to cross-erasure (Pe/Pp) increases as (c/a) becomes smaller.

For example, at a track pitch P=0.5 μm, when c/a=1, resistance to cross-erasure (Pe/Pp) becomes 1. With c/a=0.8, (Pe/Pp) becomes about 1.05, i.e. a 5% increase. Moreover, at a track pitch P=0.6 μm, when c/a=1, (Pe/Pp) increases to about 1.39. Furthermore, at a track pitch P=0.7 μm, when c/a=1, resistance to cross-erasure (Pe/Pp) becomes 1.5, and at c/a=0.8, (Pe/Pp) increases to 1.58. From this, it is preferable for c/a to be 0.8 or less, and more preferably 0.7 or less.

Figure 4:
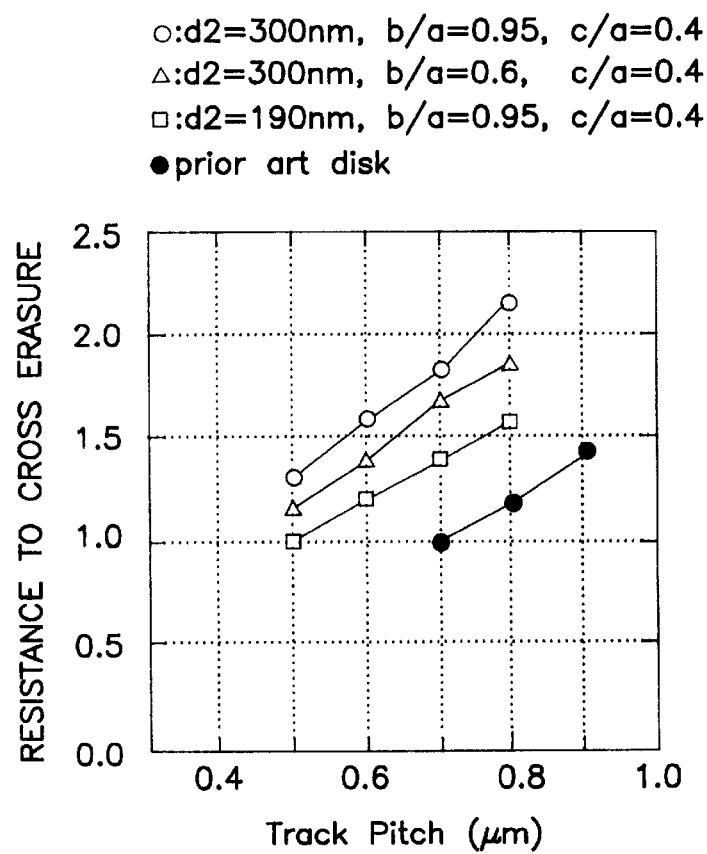
FIG. 4 is a graph of resistance to cross erasure and track pitch for an optical disk according to a preferred embodiment of the present invention.

As illustrated in FIG. 4, resistance to cross-erasure (Pe/Pp) is plotted against track pitch in optical disks. FIG. 4 illustrates that when track pitch (P) is large, resistance to cross-erasure naturally increases. Moreover, when a difference in level (d2) of the recording film increases resistance to cross-erasure is increased in comparison with conventional optical disks. The limit for a conventional optical disks is a track pitch (P) of 0.9 μm. However, in accordance with the preferred embodiments of the present invention, even when track pitch (P) is reduced to 0.5 μm, sufficient resistance to cross erasure is obtained.

Moreover, when changes are caused in the ratio (b/a) of the film thicknesses in the land and groove portions, the recording sensitivity differs in both the lands and the grooves. Furthermore, the resistance to cross-erasure decreases as (b/a) decreases. Nevertheless, the optical disks in accordance with the preferred embodiments of the present invention obtain sufficient resistance to cross-erasure in comparison with conventional optical disks.

Figure 5:
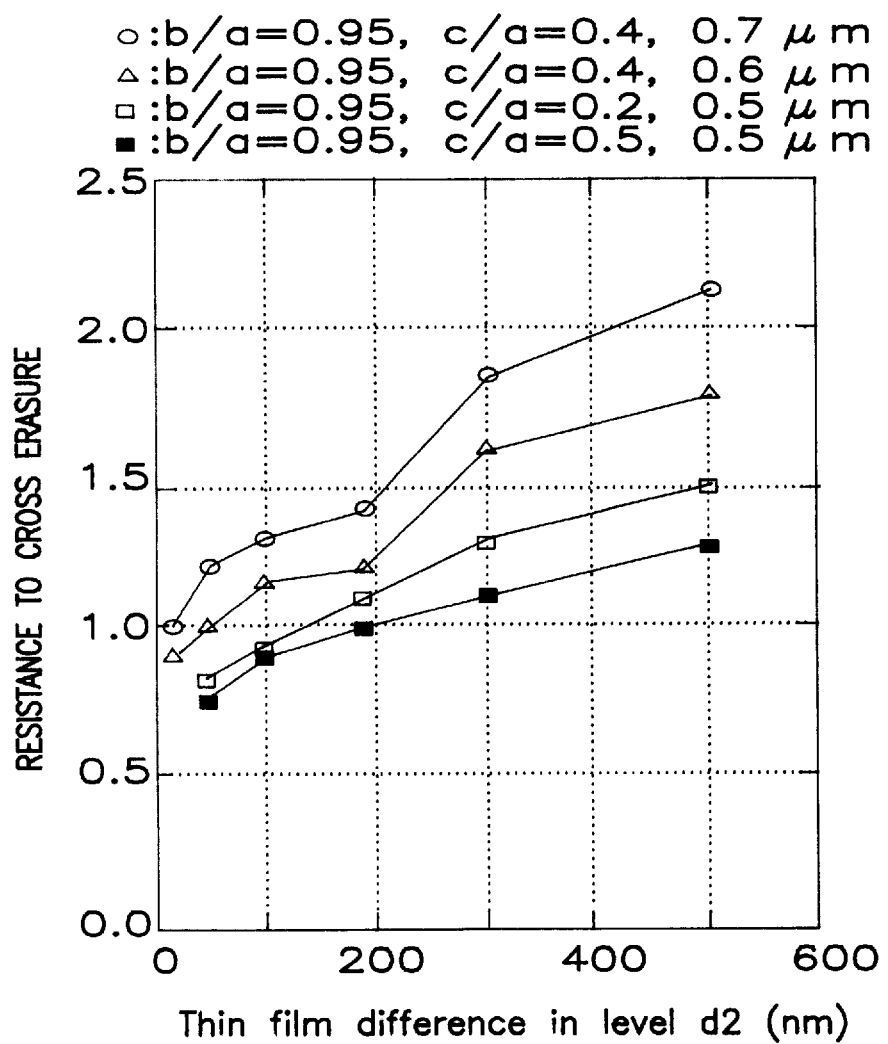
FIG. 5 is a graph of resistance to cross erasure and a difference in recording film level for an optical disk according to a preferred embodiment of the present invention.

FIG. 5 is a graph representing optical disks under the above conditions where resistance to cross-erasure (Pe/Pp) is plotted against a difference in level (d2) of the recording film 11. FIG. 5 illustrates that resistance to cross-erasure, in comparison with conventional optical disks, increases when a difference in level (d2) of the recording film is increased.

In this manner, resistance to cross-erasure can be increased by making film thickness of the recording film non-uniform. In particular, when the settings are d2=100–800nm, b/a=0.6–1.1, and c/a=0–0.8, good resistance to cross-erasure is obtained. As a result, it is possible to narrow track pitch (P) in comparison with conventional optical disks. In other words, although conventional track pitch is limited to 0.9 μm, sufficient resistance to cross erasure may be obtained even at a track pitch of 0.5 μm or less.

When film thickness (c) in the groove sidewall portions is thinner than film thickness (a) on the lands, resistance to cross-erasure is increased because the transmission of heat is screened off. Moreover, when a difference in level (d2) of recording film 11 is increased, resistance to cross-erasure also increases because the transmission of heat is screened off. As a difference in level (d2) increases, the distance over which heat is transmitted also increases, thereby increasing resistance to cross-erasure.

The present invention also includes the optical disks which have a plurality of magnetic layers or phase change layers.

Additionally, in the case of phase change medium, the resistance to cross-erasure also increases more than 3 dB.

If the wave length λ of the laser beam is short, Wg, Wl and $d_2$ are better to be determined as in the following equations:

$$0.588\lambda < Wg < 1.47\lambda$$

$$0.588\lambda < Wl < 1.47\lambda$$

$$0.147\lambda < d_2 < 1.1766\lambda.$$

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical disk, comprising:
   a substrate formed with grooves and lands for tracking an optical signal and having a surface coated with a recording film,
   wherein the grooves have a width (Wg) and the lands have a width (Wl) each between 0.4–1.0 μm, a difference between a top of the coated lands and a top of the coated grooves is between 100 nm–800 nm, and a ratio (b/a) of film thickness (b) on the top of the groove and film thickness (a) on the top of the land is between 0.6–1.1.

2. The optical disk according to claim 1, wherein a recording film of thickness (c) coats sidewall surfaces of each land and a ratio (c/a) is between 0–0.8.

3. The optical disk according to claim 1, wherein the recording film includes a plurality of distinct layers.

4. The optical disk according to claim 3, wherein the recording film has three layers.

5. The optical disk according to claim 4, wherein a first layer of the three layers is a transparent layer, a second layer of the three layers is a recording layer, and a third layer of the three layers is a transparent layer.

6. The optical disk according to claim 5, wherein the second layer is TbFeCo.

7. The optical disk according to claim 5, wherein the first and third layers are silicon nitride.

8. The optical disk according to claim 7, wherein the second layer is TbFeCo.

9. An optical disk, comprising:
   a land formed on a surface of the optical disk having a width (Wl) between 0.4 μm–1.0 μm;
   a groove formed on the surface of the optical disk having a width (Wg) between 0.4 μm–1.0 μm; and
   a recording film coating said land and said groove,
   wherein a level (d2) from a top of the recording film on said land to a top of the recording film on said groove is between 100 nm–800 nm.

10. The optical disk according to claim 9, wherein recording film thickness coating said land is denoted by (a), recording film thickness coating said groove is denoted by (b), and a ratio (b/a) is between 0.6–1.1.

11. The optical disk according to claim 10, wherein a recording film of thickness (c) coats sidewall surfaces of each land and a ratio (c/a) is between 0–0.8.

12. The optical disk according to claim 10, wherein the recording film includes a plurality of distinct layers.

13. The optical disk according to claim 12, wherein the recording film has three layers.

14. The optical disk according to claim 13, wherein the second layer is TbFeCo.

15. The optical disk according to claim 13, wherein a first layer of the three layers is a transparent layer, a second layer of the three layers is a recording layer, and a third layer of the three layer is a transparent layer.

16. The optical disk according to claim 15, wherein the first and third layers are silicon nitride.

17. The optical disk according to claim 16, wherein the second layer is TbFeCo.

18. An optical disk, comprising:

a land formed on the surface of the optical disk having a width (Wl) between 0.4 $\mu$m–1.0 $\mu$m;

a groove formed on the surface of the optical disk having a width (Wg) between 0.4 $\mu$m–1.0 $\mu$m; and a recording film coating said land and said groove, wherein a level (d2) from a top of the recording film on said land to a top of the recording film on said groove is between 100 nm–800 nm, recording film thickness coating said land is denoted by (a), recording film thickness coating said groove is denoted by (b), recording film thickness coating the sidewall surfaces of each land is denoted by (c), a ratio (b/a) is between 0.6–1.1, and a ratio (c/a) is between 0–0.8.

19. The optical disk according to claim 18, wherein the recording film includes a first transparent layer, a second recording layer, and a third transparent layer.

20. The optical disk according to claim 19, wherein the first and third layers are silicon nitride and the second layer is TbFeCo.

21. An optical disk, comprising:

a substrate formed with grooves and lands for tracking an optical signal and having a surface coated with a recording film, wherein the grooves have a width (Wg) and the lands have a width (Wl) each between 0.4 $\mu$m–1.0 $\mu$m, a difference between a top of the coated lands and a top of the coated grooves is between 50 nm–800 nm, and a ratio (b/a) of film thickness (b) on the top of the groove and film thickness (a) on the top of the land is between 0.6–1.1.

22. An optical disk, comprising:

a land formed on a surface of the optical disk having a width (Wl) between 0.4 $\mu$m–1.0 $\mu$m;

a groove formed on the surface of the optical disk having a width (Wg) between 0.4 $\mu$m–1.0 $\mu$m; and a recording film coating said land and said groove, wherein a level (d2) from a top of the recording film on said land to a top of the recording film on said groove is between 50 nm–800 nm.

23. An optical disk, comprising:

a land formed on the surface of the optical disk having a width (Wl) between 0.4 $\mu$m–1.0 $\mu$m;

a groove formed on the surface of the optical disk having a width (Wg) between 0.4 $\mu$m–1.0 $\mu$m; and a recording film coating said land and said groove, wherein a level (d2) from a top of the recording film on said land to a top of the recording film on said groove is between 50 nm–800 nm, recording film thickness coating said land is denoted by (a), recording film thickness coating said groove is denoted by (b), recording film thickness coating the sidewall surfaces of each land is denoted by (c), a ratio (b/a) is between 0.6–1.1, and a ratio (c/a) is between 0–0.8.

* * * * *

UNITED STATES PATENT AND TRADEMARK OFFICE
CERTIFICATE OF CORRECTION

PATENT NO. : 5,856,969
DATED : January 5, 1999
INVENTOR(S) : Madoka NISHIYAMA

It is certified that error appears in the above-identified patent and that said Letters Patent is hereby corrected as shown below:

Title Page, Item [75] change "Yokohana" to --Yokohama--;

Column 3, lines 3, 10, and 18, change "(Wl)" to --(W$\ell$)--;

Column 4, line 6, change "(Wl)" to --(W$\ell$)--;

Column 6, lines 11 and 16, change "(Wl)" to --(W$\ell$)--;
line 31, (claim 1) change "(Wl)" to --(W$\ell$)--;
line 56, (claim 9) change "(Wl)" to --(W$\ell$)--;

Column 7, line 20, (claim 18), change "(Wl)" to --(W$\ell$)--;

Column 8, line 6, (claim 21), change "(Wl)" to --(W$\ell$)--;
line 15, (claim 22), change "(Wl)" to --(W$\ell$)--;
line 24, (claim 23), change "(Wl)" to --(W$\ell$)--;

Signed and Sealed this

Seventeenth Day of August, 1999

Attest:

Q. TODD DICKINSON

*Attesting Officer*     *Acting Commissioner of Patents and Trademarks*